MULTI-FREQUENCY CODE SIGNALLING METHODS
Filed Feb. 24, 1965
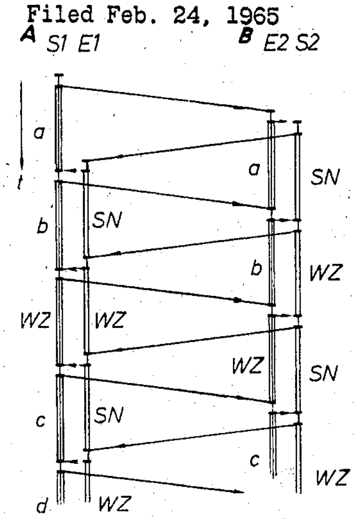
Fig. 2
Fig. 3 Fig. 4
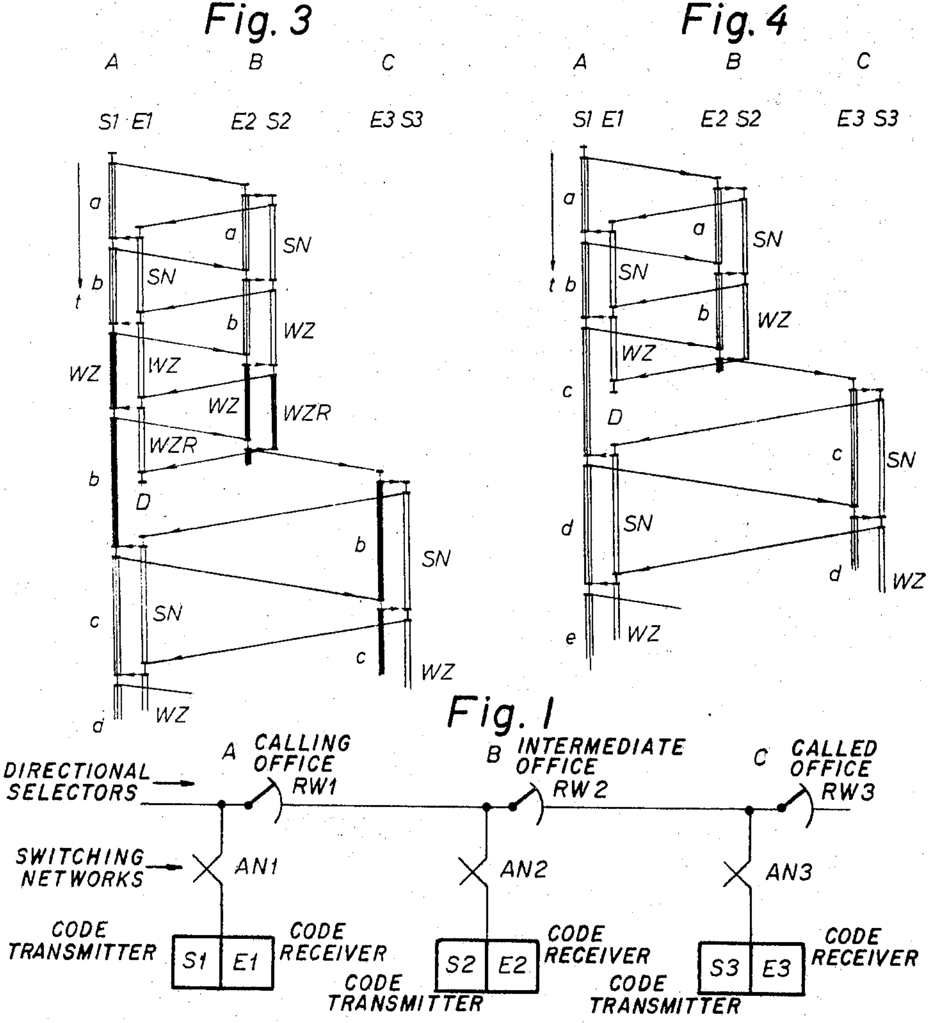
Fig. 1

3,441,676
Patented Apr. 29, 1969

3,441,676

MULTI-FREQUENCY CODE SIGNALLING METHODS

Theodor Burian, Ditzingen, and Hermann Schoo, Leonberg, Germany, assignors to International Standard Electric Corporation, New York, N.Y., a corporation of Delaware Filed Feb. 24, 1965, Ser. No. 434,906
Claims priority, application Germany, Mar. 6, 1964, St 21,796
Int. Cl. H04m *3/00*
U.S. Cl. 179—16 2 Claims

ABSTRACT OF THE DISCLOSURE

Multi-frequency code compelled method wherein the speed is increased by transmitting the signals without intervals. If the signals are equal, succeeding signals are marked by separate repeating signals. The difficulties at through-signalling with such signals are avoided in that the through-office cuts through only when, if so required, a normal code signal is transmitted for evaluation through an additional repeating step for the next following exchange office.

The invention relates to supervisory signalling systems, and more particularly multi-frequency code compelled signalling methods with through-signalling useful for telecommunication.

Supervisory signalling methods are used in telephony preferably to transmit the information items required to establish a connection. A sending or calling station emits a code signal and the calling station receives a backward signal from the receiving or called station as soon as the emitted signal has been correctly received and evaluated. Responsive to the reception and evaluation of the backward signal, the emission of the code signal is stopped at the transmitting or calling station. As soon as the code signal is no longer received at the receiving station the backward signal is stopped. The end of the backward signal means that another code signal can be emitted from the transmitting station.

Consider two exchange offices that are participating in establishing a connection then the afore-described compelled signalling method can be initiated in two different ways. When in the originating exchange office, a code signal is directly applied, this is called a compelled sending method. When the information is interrogated by applying a calling signal at the called exchange office, such a method is called a compelled interrogating method. Both signalling methods show the great advantage in that no defined advance time is required for any signals because all switching processes are completed compulsorily and control each other. Transmission periods of the connecting links cannot lead to a wrong evaluation of the code signals because these methods automatically adapt themselves to the transmission properties of the connecting leads.

These signalling methods, however, face problems because the signalling speed is greatly reduced. This fact is particularly important when there are long transit time periods on the transmission lines and when several code signals are transmitted. Since switching off of the code signals are made compulsorily through sending and receiving stations, practically approximately half of the signalling period is occupied by code signals.

There are also signalling methods known in which the code signals can be transmitted, succeeding each other directly. In such methods equal succeeding code signals are marked alternately by the code signal itself and a particular repeating signal. This enables distinct evaluation at the receiving point of the number and the value of the code signals transmitted. This method provides an essentially faster signalling speed.

The signalling method according to the invention uses said known method in order to increase the signalling speed with multi-frequency code compelled methods. Since in the signalling system according to the invention a through-signalling to the succeeding exchange offices is also provided the introduction of the known methods is difficult.

Accordingly, an object of this invention is to provide faster, more efficient supervisory signalling methods. A related object of the invention is to provide improved multi-frequency code compelled signalling methods for through signalling of higher speed than heretofore known.

It is another object of the invention to create a multi-frequency code compelled system which makes use of the advantages of the known signalling method which operate without signal intervals and, nevertheless, enable a proper and distinct through-signalling to the succeeding exchanges.

The inventive multi-frequency code compelled signalling system with through-signalling is characterized in this that the succeeding code signals are transmitted in a way known per se without intervals and that succeeding equal code signals are represented alternately by the code signal itself and a separate repetition code signal. During the through-signalling through said exchange office the first code signal for the succeeding office is requested and supervised. In the intermediate or through-office a separate repeating cycle is initiated when the repetition code signal is received from the originating office. This repeating cycle in the through-office, inserted if required, warrants that the succeeding exchange office receives a normal code signal which distinctly marks a value. In order to avoid any signal interval at the through-signalling in the forward direction care is taken that in the originating office and in the terminating office the code signal applied by the sender is switched off only when the aligned receiver has registered a new code signal. Imitation of the repeating code signals through wide-band interfering noise is avoided in that as the normal repeating code signal and as the separate repeating code signal separate, such signals are provided in the same code. By this measure, the code signals can supervise and check the code in the same manner. During the supervising process in the through-office the invention provides that in said through-office direct through-connection is made, if the last received code signal in the through-office represents no repeating code signal and the received code signal is required in the succeeding office as a first information digit. In the through-office the information digit, required for the succeeding office is requested in the originating exchange and is supervised on the appearance of a repeating code signal. In the latter case the decision in the through-office must be made when a repeating code signal should be received as to whether a separate repeating code signal is transmitted to the exchange office, and that there the code signal is emitted associated with the arriving repeating code signal. A through-connection is made in the through-office when a normal code signal is received. When the through-connection is completed signalling to the succeeding office is made in the same way. The advancement in establishing a connection can be checked at the originating office in that the signal interval occurring in the receiver of the originating office during the signalling cycle is evaluated as through-connecting criterion.

The invention is now in detail explained with the aid of the accompanying drawings, wherein:

FIG. 1 shows a principal block diagram of the signalling facilities in the originating office, in the through-office, and in the succeeding exchange office;

FIG. 2 shows a time diagram of the signalling method between two exchanges, in compliance with the invention;

FIG. 3 shows the time diagram of the signalling method with through-connection and repeating cycles; and FIG. 4 shows the time diagram of the signalling method with through-connection but without repeating cycle.

As shown in FIG. 1, a line is seized from the originating office A via the directional selector RW1. The sending and receiving devices with the senders S1 and S2 and the receivers E1 and E2, respectively are connected through the switching elements AN1 and AN2. The signals are transmitted using the compelled method. After some information digits have been transmitted, it is known in the through-office B, through which the succeeding office C must be connected and where information digits are required as a first code signal for said exchange office. When the known signalling systems are used without signal intervals, the requested information may appear as a repeating signal. Consequently the succeeding exchange office C is not in a position to evaluate such code signals.

The time diagram according to FIG. 2 shows the signal emission in a compelled system. In the originating office A the first information digit is emitted by the sender S1. The code signal *a* may represent, for example, one of the digits "1" to "0." The receiver E2 in the through-office B receives the code signal *a* and evaluates it. Thereupon the backward signal SN is transmitted via the sender S2. This code signal means for example "emit the next following information digit." The code signal SN is received via the receiver E1. Thereupon emission of the code signal *a* is finished and a new code signal *b* is transmitted. Said code signal *b* represents a digit other than the code signal *a*. In the through-office B the sender S2 is advanced at the registering of the code signal *b*. When the next following information digit should be requested, a repeating code signal WZ is emitted, instead of the code signal SN. This signal WZ means that it has the meaning of the previously transmitted code signal. It is thereby warranted that a safe change occurs from code signal to the next following code signal.

In the backward direction the other possible code signals in the code can be used, too. For example, a defined information digit can be associated to them so that an aimed interrogation of the information digits is possible. When the repeating code signal WZ of the sender S2 is registered by the receiver E1 of the exchange A the compelled system cycle is advanced. Since the next following digit to be transmitted corresponds to the preceding ones the repeating code signal WZ is now transmitted in the forward direction. The receiver E2 registers said code signal. It is thereby determined in the through-office that this information digit represents the same digit as the digit marked by the preceding code signal *b*. Through the code signal SN the cycle is advanced until in the exchange office B all information items required for the through-connection have been received. Due to these information items the succeeding exchange office C is reached. The exchange office B selects which information digit is sent as a first code signal to the succeeding office C.

FIG. 3 shows the conditions during through-connection in the exchange office B. The code signals *a*, *b* WZ are now transmitted to the through-office B as explained with the aid of FIG. 2. The succeeding exchange office C should now receive the last code signal as a first information. Since in our case herein described a repeating code signal WZ is given the following exchange office C would not recognize the meaning of the code signal. Now the through-office B inserts a separate repeating cycle. The sender S2 applies a separate repeating code signal WZR which is received in the originating office and evaluated thus that the repeating signal WZ applied in the forward direction has been properly received. The sender S1 repeats the code signal *b*. The receiver now receives said code signal and switches off the repeating code signal WZR in the sender S2. The receiver E1 in the originating office now restores to normal. The signal interval D is a criterion that through-connection is made. When the exchange office C is reached the receiver E3 responds in said office and registers the code signal *b*. The sender S3 requests with the code signal SN the next following information digit. The further signalling process between the exchange office A and the office C runs down as already described.

FIG. 4 shows a diagram for the through-connection in the office B, requiring no separate repeating cycle. Through the repeating code signal WZ the through-office requests the next following information digit for the exchange office C. The receiver E2 receives the code signal *c*. Since there is no repeating code signal WZ through-connection is made at once. The receiver E3 registers the code signal *c* and the sender S3 continues the signalling cycle with the code signal SN. The signal interval D and the receiver E1 also indicates the through-connection to the exchange office C.

While I have described the above principles of my invention in connection with specific apparatus, it is to be clearly understood that this description is made only by way of example and not as a limitation on the scope of my invention.

What is claimed is:

1. A multi-frequency code compelled signalling method for telecommunication systems with through signalling from a calling exchange through an intermediate exchange to a called exchange, each of said exchanges comprising associated signal receivers and transmitters, wherein said method comprises the following steps:

a first associated transmitter in said calling exchange transmits a first digit signal to a first associated receiver in said intermediate exchange, said received first digit signal actuates the first associated transmitter in said intermediate exchange to transmit an acknowledgment signal to a first associated receiver in said calling exchange, responsive to the receipt of said acknowledgment signal said first associated transmitter in said calling exchange is turned off and a second associated transmitter in said calling exchange is actuated to send a second digit signal to a second receiver in said intermediate exchange, responsive to the receipt of said second digit signal in the intermediate exchange said first transmitter in said intermediate exchange is turned off and a second transmitter in said intermediate exchange is actuated to transmit a repeating code signal to a second receiver in the calling exchange, responsive to the receipt of the repeating code signal in the calling exchange the second transmitter in the calling exchange is turned off and a third transmitter in the calling exchange is simultaneously actuated to transmit a third digit to the third receiver of said intermediate exchange, when the third digit for transmittal is the same as the last transmittal signal, the repeating signal is re-transmitted by the third transmitter of the calling exchange, whereby, there are no intervals between signals transmitted from the calling exchange and equal succeeding code signals are separated by the repeating code signal, the intermediate exchange determines from the received signal which called exchange to connect to the calling exchange for receiving signals therefrom, in the intermediate exchange, the repeating signal transmitter is turned off and a separate repeating cycle code signal in said intermediate exchange transmitter is simultaneously actuated responsive to receiving the repeating code signal from the calling exchange when the called exchange is connected for receiving the repeating code signal, and responsive to the receipt of the separate repeating signal by the calling exchange the last digit signal transmitted by the calling exchange prior to the transmittal of the repeating signal by the calling exchange is repeated.

2. The multi-frequency compelled signalling method for telecommunication systems of claim 1 including the additional steps of a receiving interval wherein the associated receivers of the calling exchange are not receiving any signals, the interval so provided signals the calling exchange that the called exchange is now connected.

References Cited

UNITED STATES PATENTS

| | | |
|---|---|---|
| 2,581,462 | 1/1952 | Wright et al. |
| 3,231,677 | 1/1966 | Edstrom et al. |

WILLIAM C. COOPER, *Primary Examiner.*